March 24, 1942. R. S. WAGNER 2,277,176
HINGE
Filed Aug. 15, 1940
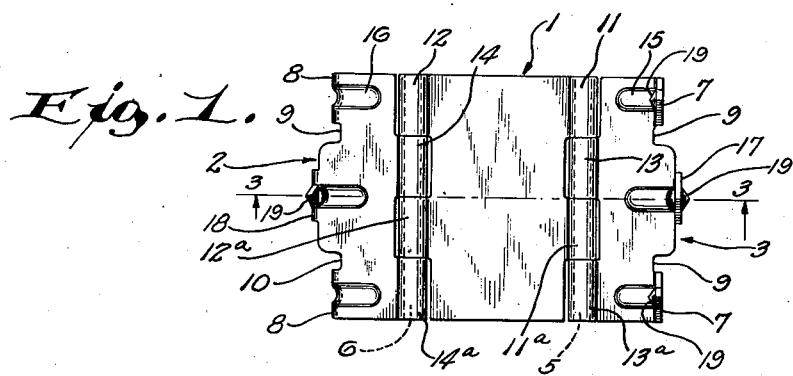
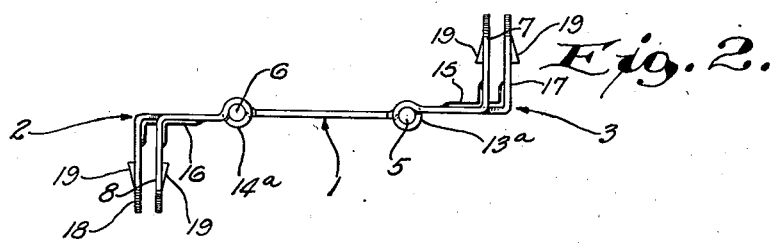
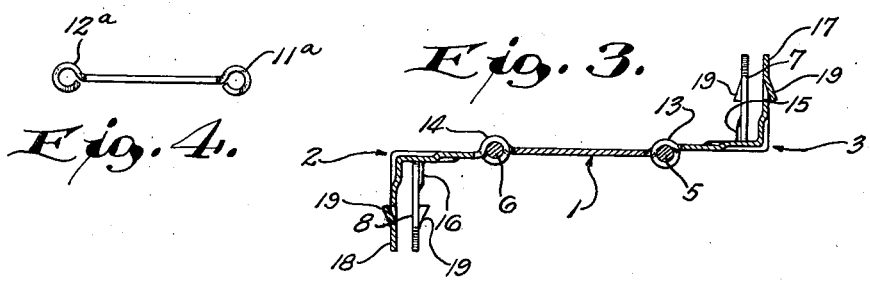
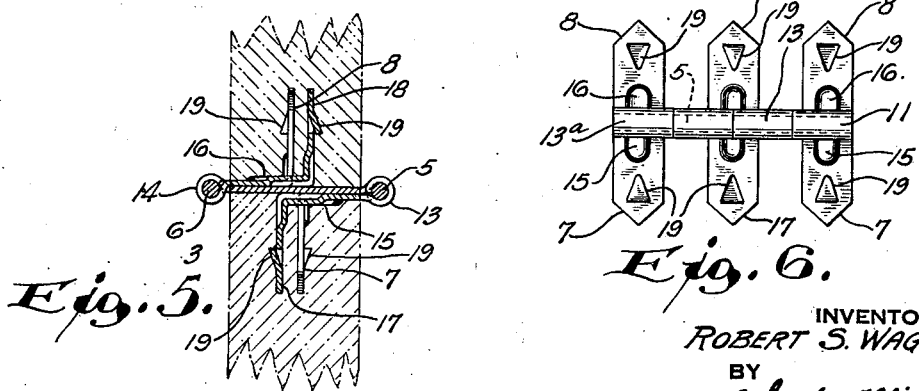
INVENTOR
ROBERT S. WAGNER
BY
John W. Michael
ATTORNEY Patented Mar. 24, 1942

2,277,176

UNITED STATES PATENT OFFICE 2,277,176

HINGE

Robert S. Wagner, Milwaukee, Wis., assignor to E. R. Wagner Manufacturing Company, Milwaukee, Wis., a corporation of Wisconsin Application August 15, 1940, Serial No. 352,721

4 Claims. (Cl. 16—163)

This invention relates to improvements in multiple pintle hinges of the type intended for use on folding screens and the like.

One of the objects of the invention is to provide a multiple pintle hinge of light weight, yet strong, adapted to be made by use of automatic machinery and having wing leaves which fold flatly against opposite sides of the connector leaf.

Another object of the invention is to provide a multiple pintle hinge which can be applied and securely fastened to the parts to be hinged without the use of separate fastenings.

The foregoing objects are accomplished by forming the connector leaf with an imperforate flat body having the pintle bearings positioned so that their axes lie in the center plane of the body, by providing the wing leaves with integrally formed fastening prongs projecting laterally from one side of the body and having securing barbs thereon, and by offsetting the pintle bearings in the opposite direction from said prongs so that their axis is spaced from the other side of the body. The imperforate connector leaf can be made smaller and hence lighter while still meeting strength requirements. The offset pintle bearings permit the wing leaves to fold flatly against the connector leaf. By means of the integral fastening prongs and barbs the hinge can be applied to one part to be hinged by applying pressure against the connector leaf, and can be applied to the other part to be hinged by applying pressure against the wing leaf.

To adapt the hinge to be made by automatic machinery the hinge bearings are formed from integral projections which are curled around the pintles. When viewed from the same edge of the hinge, the bearings on one side of the connector leaf are curled in clockwise direction, and the bearings on the other side are curled in counter-clockwise direction. The bearings of the wing leaves are curled in the opposite direction from the bearings on the connector leaf to which they are secured by the pintle. This facilitates the assembly of the leaves as the curling action and insertion of the pintles may be accomplished simultaneously.

The novel features, which are considered characteristic of the invention, are set forth with particularity in the appended claims. The invention itself, however, both as to its organization and its method of operation, together with additional objects and advantages thereof, will best be understood from the following description of a specific embodiment when read in connection with the accompanying drawing, in which:

Figure 1 is a view in top elevation of a multiple pintle hinge embodying the invention and with the wing leaves extended and lying substantially in the plane with the connector leaf;

Figure 2 is a view in front elevation of the hinge shown in Figure 1;

Figure 3 is a transverse sectional view of the hinge taken on line 3—3 of Figure 1;

Figure 4 is a fragmentary view in front elevation of the connector leaf;

Figure 5 is a transverse sectional view similar to Figure 3, but with the wing leaves folded in flatly against the connector leaf, and with parts to be hinged shown diagrammatically; and Figure 6 is a view in side elevation of the hinge shown folded as in Figure 5.

Referring in greater detail to the drawing, the multiple pintle hinge comprises generally a connector leaf 1, a left-hand wing leaf 2, a right-hand wing leaf 3. Pintles 5 and 6 pivotally interconnect the wing leaves and the connector leaf.

In order to lighten the weight of the hinge, while still maintaining sufficient structural strength, the wing leaves are provided with integrally formed fastening prongs 7, 8, 17 and 18. The fastening prongs 7 and 8 are formed at the edge of cut-backs 9 and 10 so that they project from approximately the central portion of the body of the wing leaves.

The fastening prongs 17 and 18 are laterally slightly offset from the prongs 7 and 8 to provide for good holding strength. Each prong is provided with a securing barb 19 formed integrally on the side thereof. The barb 19 is inherently biased to spring outwardly after the prong is driven in the material to engage it and prevent easy withdrawal. The barbs 19 on prongs 7 are disposed on the opposite side to the barb 19 on prong 17. This is also true of the barbs on prongs 8 and prong 18. A better overall gripping effect is thus obtained. The prongs may be stiffened by the use of stiffening ridges 15 and 16. With these prongs the wing leaf may be secured to the edge of a part to be hinged by merely applying pressure directly to the wing leaf or to the connector leaf when it is folded flatly against the respective wing leaf. This eliminates the necessity of the screw-driver hole customarily found in connector leaves. The omission of this screw-driver hole permits the entire dimension of the connector leaf to be made smaller while still retaining sufficient strength.

In order to facilitate the manufacture, the hinge bearings are so designed that the assembly takes place by curling integral projections around the pintles. The right-hand bearings 11 and 11a on the connector leaf 1, as viewed in Figure 4, are curled in a clockwise fashion about the pintle 5 in such fashion that the axis of the bearing lies substantially in the center plane of the connector leaf. The left-hand bearings 12 and 12a on the connector leaf 1 are curled about the pintle 6 in a counter-clockwise direction. The axes of these bearings also lie substantially in the center plane of the connector leaf 1.

The bearings 13 and 13a on the right-hand wing leaf 3 are curled about the pintle 5 in a counter-clockwise direction, and are offset in such a manner that their axes lie below the bottom of the wing leaf 3, as viewed in Figures 2 and 3. The prong 7 on wing leaf 3 extends upwardly, as viewed in Figures 2 and 3. The right-hand wing leaf 3, as viewed in Figure 5, can be swung in a clockwise direction about the pivot 5 so as to lie flatly against one side of the body portion of connector leaf 1, whereupon the prong 7 may be easily inserted in the edge of the part to be hinged by pressure applied to the top of the connector leaf. The offsetting of hinge bearings 13 and 13a permit of the flat fit between the wing leaf 3 and connector leaf 1.

The bearings 14 and 14a on the left-hand wing leaf 2 are curled in a clockwise fashion, as viewed in Figures 2 and 3, about the pintle 6. They are also offset when so viewed so that their axes lie above the top of the wing leaf 2. In this case the fastening prong 8 depends downwardly from the body of the wing leaf 2 and the leaf may be turned in a clockwise direction so as to lie flatly against the top surface of the connector leaf 1, the offset bearings providing for the flat fit between the body portion of the wing leaf and the connector leaf. With the bearings curled as heretofore described, the curling and assembling of both wing leaves to the connector leaves may be done simultaneously.

Although there is shown and described certain specific embodiments of the invention, many modifications thereof are possible. The invention is not to be restricted except in so far as is necessitated by the prior art and by the spirit of the appended claims.

I claim:

1. A multiple pintle hinge having a single flat bodied connector leaf, wing leaves pivotally secured to said connector leaf, said wing leaves being provided with integral fastening prongs extending at right angles to the plane of said wing leaves and adapted to be driven into the material to be hinged by pressure applied against said connector leaf when a wing leaf is flatly folded thereagainst.

2. A multiple pintle hinge having a single flat bodied connector leaf and two wing leaves, the connector leaf being provided with pintle bearings positioned so that the axes thereof lie in the center plane of the body portion of said leaf, each of said wing leaves having an integrally formed fastening prong projecting laterally therefrom, pintle bearings positioned on each of said wing leaves and offset in a direction opposite from said prong so that the axis thereof is spaced from the side of the body of the wing leaf opposite said prong.

3. A multiple pintle hinge having a flat bodied imperforate metal connector leaf, hinge bearings formed on opposite edges of said connector leaf by curled integral projections, the bearings on one side being curled clockwise, the bearings on the other side being curled counterclockwise as viewed from the same side, said bearings being positioned with their axes lying in the center plane of said leaf, a right-hand wing leaf having a fastening prong projecting laterally from the top side thereof when said wing leaf is extended to lie in the plane of the connector leaf, hinge bearings on said wing leaf curled in counter-clockwise direction with the axis thereof offset laterally from said wing leaf on the opposite side from said prong, a pintle pivotally connecting the bearings of said right-hand wing leaf and said connector leaf, a left-hand wing leaf having a fastening prong projecting from the bottom side thereof when said leaf is extended to lie in the plane of the connector leaf, hinge bearings on said left-hand wing leaf curled in a clockwise direction with the axis thereof offset laterally from said wing leaf on the opposite side from said prong, and a pintle pivotally connecting the bearings of said left-hand wing leaf and said connector leaf.

4. A multiple pintle hinge having a single connector leaf and two wing leaves, fastening prongs integrally formed on said wing leaves, the prongs on one wing leaf extending oppositely from the prongs on the other wing leaf, said prongs having barbs comprised of integral portions of said prongs projecting laterally from the sides thereof.

ROBERT S. WAGNER.